US008811729B2

(12) United States Patent
Finlayson et al.

(10) Patent No.: US 8,811,729 B2
(45) Date of Patent: *Aug. 19, 2014

(54) ILLUMINANT ESTIMATION

(71) Applicant: Apple Inc., Cupertino, CA (US)

(72) Inventors: Graham D. Finlayson, Taverham (GB); Clement Fredembach, Servion (CH)

(73) Assignee: Apple Inc., Cupertino, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/743,893

(22) Filed: Jan. 17, 2013

(65) Prior Publication Data

US 2013/0129204 A1 May 23, 2013

Related U.S. Application Data

(63) Continuation of application No. 12/514,093, filed on Mar. 19, 2010, now Pat. No. 8,385,637.

(30) Foreign Application Priority Data

Nov. 8, 2006 (GB) .................................. 0622250.9
Nov. 8, 2007 (GB) ................. PCT/GB2007/004248

(51) Int. Cl.
*G06K 9/00* (2006.01)

(52) U.S. Cl.
USPC ........................................................ 382/162

(58) Field of Classification Search
None
See application file for complete search history.

(56) References Cited

U.S. PATENT DOCUMENTS

| 7,046,288 | B1 | 5/2006 | Finlayson |
| 7,084,907 | B2 | 8/2006 | Takeshita |
| 7,830,419 | B2 | 11/2010 | Sakurai |
| 7,835,002 | B2 | 11/2010 | Muhammed et al. |
| 2003/0016863 | A1 | 1/2003 | Risson |
| 2005/0226496 | A1 | 10/2005 | Finlayson |
| 2006/0110052 | A1 | 5/2006 | Finlayson |

FOREIGN PATENT DOCUMENTS

| JP | 2004109018 | 4/2004 |
| JP | 2004177679 | 6/2004 |
| JP | 2004242099 | 8/2004 |
| WO | 0001164 | 1/2000 |

OTHER PUBLICATIONS

"Data for Computer Vision and Computational Colour Science", Computational Vision Lab, School of Computing Science, Simon Fraser University, http://www.cs.sfu.ca/~colour/data/, downloaded Feb. 2, 2012.

(Continued)

Primary Examiner — Li Liu
(74) Attorney, Agent, or Firm — Wong, Cabello, Lutsch, Rutherford & Brucculeri, LLP

(57) ABSTRACT

In a method of chromagenic illuminant estimation pixels from mutually-corresponding images with different filtering are compared, a fraction of the brightest pixels being selected for a subsequent chromagenic estimation. The pixels may be at corresponding locations or they may correspond in that their mean brightness is in the same rank order. In one method, in which, in a first preprocessing stage, for a database of m lights $E_i(\lambda)$ and n surfaces $S_j(\lambda)$ there is calculated $T_i \sim Q^F Q^+$ where $Q_1^F$ and $Q_F$ represent the matrices of unfiltered and filtered sensor responses to the n surfaces under the i th light and + denotes an inverse, and in a second operation stage, given P surfaces in an image and 3×P matrices Q and $Q^F$, from these matrices there are chosen the r % brightest pixels giving the matrices Q' and $Q'^F$, and the scene illuminant $P_{est}$ is estimated where formula (I) and (II).

20 Claims, 4 Drawing Sheets

(56) References Cited

OTHER PUBLICATIONS

Cheng Lu et al: 'Shadow Removal via Flash/Noflash Illumination;' 2006 IEEE 8th Workshop on IEEE.

Comaniciu, Dorin, (2002) "Mean Shift: A Robust Approach Toward Feature Space Analysis," IEEE Transactions on Pattern Analysis and Machine Intelligence, vol. 24, No. 5, pp. 603-619.

David A. Forsyth. "A novel algorithm for color constancy," International Journal of Computer Vision, 5:5-36, 1994.

Finlayson et al., (1993) Diagonal Transforms Suffice for Color Constancy, Int. Conf. on Computer Vision (ICCV93).

Finlayson et al., (2002) Removing Shadows from Images, ECCV 2002: European Conference on Computer Vision, pp. 4:823-836, Lecture Notes in Computer Science vol. 2353.

Finlayson et al., (2005) Human Visual Processing: Beyond 3 Sensors, IEE Int. Conf. on Visual Information Engg. (VIE2005), pp. 1-7.

Finlayson et al., Convex Programming Color Constancy, In: Workshop on Color and Photometric Methods in Computer Vision, IEEE, Oct. 1-7, 2003.

Finlayson G D et al: 'Colour Constancy Using the Chromagenic Constraint' Computer Vision and Pattern Recognition, 2005. CVPR 2005. IEEE Computer Society Conference on San Diego, CA. USA Jun. 20-26, 2005, Piscataway, NJ, USA,IEEE Jun. 20, 2005, pp. 1079-1086, XP 010817463 ISBN: 0-7695-2372-2.

Finlayson G et al: 'Detecting Illumination in Images;' Computer Vision 2007. IEEE 11th International Conference on Oct. 14, 2007.

Finlayson G et al: "4-Sensor Camera Calibration for Image Representation Invariant to Shading, Shadows, Lighting, and Specularities;" Proceedings of the Eight IEEE International Conference on Computer Vision, Jul. 7, 2001.

Fredembach et al., (2005) Hamiltonian path based shadow removal, British Machine Vision Conf.

Funt, B., et al., 'Is Machine Colour Constancy Good Enough?', 5th European Conf. on Computer Vision, pp. 455-459, Springer, Jun. 1998.

G.D. Finlayson, et al. 'Shades of gray and colour constancy,' In IS&T and SID's 12th Color Imaging Conference, pp. 37-41, 2004.

G.D. Finlayson, et al. "Color constancy under varying illumination," in Proceedings of the fifth International Conference on Computer Vision, pp. 720-725. IEEE Computer Society, Jun. 1995.

G.D. Finlayson, et al. "Gamut constrained illuminant estimation," Proceedings of the 9th International Conference on Computer Vision, 2, Oct. 2003.

G.D. Finlayson. "Color in perspective," IEEE transactions on Pattern analysis and Machine Intelligence, pp. 1034-1038, Oct. 1996.

Guttmann et al., "Semi-automatic stereo extraction from video footage," Proc. IEEE 12th International Conference on Computer Vision, pp. 136-142 (2009).

K. Barnard, et al. "A comparison of computational color constancy algorithms; part two: Experiments with image data," IEEE Transactions on Image Processing, 11 (9):985-996, 2002.

Maloney, "Surface Colour Perception and Environmental Constraints", Colour Perception: Mind and the Physical World, Didier Heyer, Oxford Univ. Press, pp. 279-299, 2003.

Marimont et al., (1992) Linear models of surface and illuminant spectra, /. Opt. Soc Am. A., 1905-1913.

McCamy et al., (1976) "A Color-Rendition Chart," Journal of Applied Photographic Engineering, vol. 2, No. 3, pp. 95-99.

P.M. Hubel, et al. "Matrix calculations for digital photography," in IS&T and SID's 5th Color Imaging Conference, pp. 105-111, 1997.

Parkkinen et al., (1989) Characteristic spectra of Munsell colors, /. Opt. Soc. Am. A, 6:318-322.

Communication Pursuant to Article 94(3) EPC mailed Dec. 29, 2011, Application No. 06 726 616.3, 4 pages.

Rubin et al., (1982) Color Vision and Image Intensities: When are Changes Material?, Biol. Cybern., 45:215-226.

Salvador E et al: 'Cast shadow segmentation using invariant color features;' Computer Vision and Image Understanding, Academic Press, San Diego, CA, vol. 95, No. 2, Aug. 2004.

Schiele, B., et al., 'Gaze Tracking Based on Face-Color', International Workshop on Automatic Face- and Gesture-Recognition, Jun. 1995.

Tappen et al., (2003) Recovering Intrinsic Images from a Single Image, Advances in Neural Information Processing Systems 15, MIT Press.

Tsukada et al., (1990) An Approach to Color Constancy Using Multiple Images, Int. Conf. on Computer Vision (ICCV90), pp. 385-389.

V. Cardei, et al. "Learning color constancy," In 4th IS&T and SID Color Imaging Conference, 1996.

Yang Wang and Dimitris Samaras, "Estimation of Multiple Illuminants from a Single Image of Arbitrary Known Geometry" ECCV 2002, pp. 272-288.

Buschbaum, G., (Jul. 1980), "A Spatial Processor Model for Object Colour Perception," Journal of the Franklin Institute, Pergamon Press Lld, 26 pages.

Finlayson et al., (Nov. 2001) Convex Programming Color Constancy, 8 pgs.

Jiang, et al., (2003) Tracking Objects with Shadows, 10 pgs.

G.D. Finlayson, P.M. Morovic, and S.D. Hordley. The chromagenic colour camera and illuminant estimation. Proc. of the 13th Color Imaging Conference, pp. 20-25, 2005.

G.D. Finlayson, S.D. Hordley, and P.M. Morovic "Chromagenic filter design", Proceedings of the 1 Oth AIC, 2005.

Kodak. Kodak Wratten Filters, Kodak Limited London, Fourth Edition 1969, p. 26.

Barnard et al., (2002) A Data Set for Color Research, Color Research and Application, vol. 27, No. 3, pp. 147-151.

Barnard et al., (2002) A Comparison of Computational Color Constancy Algorithms—Part I: Methodology and Experiments With Synthesized Data, IEEE Transactions on Image Processing, vol. 11, No. 9, pp. 972-983.

D'Zmura et al., (1993) Color constancy. I. Basic theory of two-stage linear recovery of spectral descriptions for lights and surfaces, J. Opt. Soc. Am. A, vol. 10, No. 10, pp. 2148-2165.

Finlayson et al., (2005) Colour constancy using the chromagenic constraint, Proceedings of the 2005 IEEE Computer Society Conference on Computer Vision and Pattern Recognition (CVPR'05), 8 pgs.

Finlayson et al., (2001) Color by Correlation: A Simple, Unifying Framework for Color Constancy, IEEE Transactions on Pattern Analysis and Machine Intelligence, vol. 23, No. 11, pp. 1209-1221.

Hordley et al., (2006) Reevaluation of color constancy algorithm performance, J. Opt. Soc. Am. A., vol. 23, No. 5, pp. 1008-1020.

Klinker et al., (1990) A Physical Approach to Color Image Understanding, International Journal of Computer Vision, 4, pp. 7-38.

Land, E., (1977) The Retinex Theory of Color Vision, Scientific American, vol. 237, No. 6, pp. 1-18.

Lin et al., (1997) Detection of Specularity Using Stereo in Color and Polarization Space, Computer Vision and Image Understanding, vol. 65, No. 2, pp. 336-346.

Maloney et al., (1986) Color constancy: a method for recovering surface spectral reflectance, J. Opt. Soc. Am. A., 3:29-33.

Nascimento et al., (2002) Statistics of spatial cone-excitation ratios in natural scenes, J. Opt. Soc. Am. A, vol. 19, No. 8, pp. 1484-1490.

Swain et al., (1991) Color Indexing, International Journal of Computer Vision, 7: 1, pp. 11-32.

ILLUMINANT ESTIMATION

FIELD OF THE INVENTION

The present invention relates to illuminant estimation, and in particular to a method of chromagenic illuminant estimation which concentrates on the brightest pixels. The results of the estimation may be used in the fields of digital photography or computer visuals etc. to remove the colour biases from images due to the illumination.

BACKGROUND OF THE INVENTION

Chromagenic illuminant estimation exploits the relationship between RGBs captured with a conventional digital camera and RGBs captured when a coloured filter is placed in front of the camera. This approach has two problems. First, performance is fragile; occasionally the estimation is poor. Second, there is a requirement for registered images, yet typical chromagenic cameras (e.g. a stereo rig or two surveillance cameras) will have non registered pixels.

In embodiments of the present invention, we carry out a detailed colour space error analysis of chromagenic illuminant estimation and identify RGBs which will likely lead to good and poor performance. While the good and poor sets overlap they are not the same and we find that bright RGBs tend to yield correct illuminant estimates. The bright-chromagenic algorithm attempts to find these RGBs by selecting a fixed percentage of the brightest pixels in the filtered and unfiltered images using these for chromagenic estimation. This simple strategy leads to very good estimation performance. On a large set of images including synthetic, half-synthetic and real images the bright-chromagenic algorithm delivers excellent estimation which is at least as good as all antecedent colour constancy algorithms. Bright-chromagenic plus gamut mapping delivers estimation performance which is strictly better than all other algorithms tested. Because the selection of the brightest pixels is carried out independently for the filtered and unfiltered images, the bright-chromagenic algorithm does not need any image registration and this is idea is also validated in the experiments.

The human visual system is reasonably colour constant: the colour of objects are stable when viewed under different colours of light. However, it has proven difficult to emulate this colour constancy in manufactured devices. This is not only a problem in image reproduction (e.g. digital photography) but also for a variety of computer vision tasks, such as tracking [9], indexing [16] and scene analysis [10] where stable measures of reflectance are sought or assumed for objects in a scene.

Colour constancy is generally broken down into two parts. First, the colour of the prevailing illuminant is estimated. Then, at a second stage, the colour bias due to illumination is removed. This second part is in fact quite easy and so most colour constancy algorithms focus on the illuminant estimation problem. Starting with Land's retinex [12], numerous algorithms for illuminant estimation have been proposed. The first group of algorithms make simple assumptions about the scene being observed, such as MaxRGB, in which a maximally reflective patch exists in the image (e.g. a white reflectance or equally there are surfaces, such as yellow and blue, that added together would make white), or Gray World, in which the average reflectance in a scene is gray [3].

Another group of algorithms comprises more sophisticated approaches such as neural networks, colour by correlation, which is a Bayesian method that correlates the RGBs in the image with plausible RGBs under various illuminants to find the best illuminant [6] and gamut mapping methods [7]. The last approach exploits the observation that the range, or gamut, of colours recorded by a camera depends on the colour of the light. If an RGB does not fall inside the gamut for a given light, then that light cannot be the solution to illuminant estimation. The gamut constrained illuminant estimation algorithm of Finlayson and Hordley delivers the best performance over all algorithms tested on the Simon Fraser set of real images. However, this performance is bought at the price of quite a complex algorithm. This is generally true: the simple normalisation approaches deliver reasonable performance but, thus far, the best performance requires complex algorithmic inference.

Chromagenic theory proposes that the illuminant estimation problem is easier to solve if two images of a scene are recorded: the first image is captured as normal but the second image is captured through a coloured filter. This idea seems reasonable as we often take multiple images in computer vision to help solve problems that are hard in a single image. For example, in stereo, triangulation of two images are used to recover 3-d position of points in the scene, and in photometric vision, a pair of images captured with respect to two orthogonal polarising filters can be used to identify and remove specular highlights [13].

The standard chromagenic colour constancy algorithm [5] works in two stages. The training stage is a preprocessing step where the relationship, a linear mapping, between filtered and unfiltered RGBs is calculated for a number of candidate lights. Then, those relations are tested on other images in order to estimate the actual scene illuminant. Encouragingly, like a basic stereo algorithm, the basic chromagenic algorithm often works well and this indicates both that a linear map models the relationship between filtered and unfiltered RGBs well and that the maps for different lights are different from one another. Rather discouragingly, the basic algorithm can fail rather badly.

The chromagenic algorithm's poor performance is due to two problems. Firstly, the map that best models the relationship between filtered and unfiltered RGBs can correspond to the wrong light. That is to say that the precalculated maps do a good job of modelling the broad trends in the data but there are specific instances (combinations of reflectances) where they work more poorly. This problem is analogous to difficulties encountered in colour correction by mapping the colour a camera records for display. In general most camera colours are mapped correctly but there always colours in photographs that look wrong (e.g. the violet colour of the 'morning glory' flower is generally poorly reproduced). The second problem is more down to basic engineering. The chromagenic theory is predicated on the assumption that we have pixel-wise correspondence. Indeed, to achieve the best performance, one has to compare RGBs transitions that occur between identical reflectances. Recalling the analogy to stereo, we know that stereo works when we have good pixel correspondence but finding the correspondences is the essence of much stereo research. Similarly, experiments have shown that chromagenic illuminant estimation can work, but again we need appropriate correspondences.

SUMMARY OF THE INVENTION

According to a first aspect of the present invention, there is provided a method of chromagenic illuminant estimation in which, from mutually-corresponding mages with different sets of spectral components, a fraction of the brightened pixels are used for a subsequent chromagenic estimation.

In general, if there is an image with N sensor channels, the first p measurements can be related to the second q measurements, where p+q=N.

Preferably, the images have different filtering. The images may comprise a filtered image and an unfiltered image.

There may be compared pixels with their mean brightness in the same rank order.

Alternatively there may be compared pixels in the images which are in the same pixel location.

There may be selected 0.5 to 20%, preferably 1 to 3%, and most preferably substantially 1% of the brightest pixels.

The chromagenic algorithm works by comparing m responses in a first image to a corresponding n responses in a second image.

As described in connection with our co-pending application filed on even date entitled "Detecting Illumination in Images" and claiming priority from UK patent applications 0622251.7 and 0710786.5, the number of sensors is also not important for our invention. Indeed, given a q sensor camera, our method will still work if p of the sensor responses, recorded for different lights and surfaces, are related to the remaining q−p responses by some function f( ). In one embodiment q=6 and p=3, but equally q and p could be any two numbers where p<q:q=7 and p=2, or q=3 and p=1. The last case draws attention to the fact that for a conventional RGB camera, we can relate the blue responses to the red and green responses in the manner described above. And, even though the relationship is less strong, the method will still provide a degree of illumination detection. (It will be noted that q corresponds generally to m+n in the preceding paragraph and p corresponds generally to n.)

Also, the means by which we relate the first p responses to the remaining q−p responses (for a q response camera) can be written in several general forms. Where q=6 and p=3, the unfiltered responses are related to filtered responses by a 3×3 matrix transform. More generally, this map could be any function of the form f: $\Re^3 \to \Re^3$ (a function that maps a 3-dimensional input to a 3 dimensional output). For an arbitrary q (number of sensors) and p (number of dependent responses), the mapping function f: $\Re^{q-p} \to \Re^p$.

We also point out that we can generalise how we compute the distances $\|f(I_k^{q-p}) - I_k^p\|$ where $I^{q-p}$ and $I^p$ denote the first q-p and remaining p responses and the subscript k indexes the kth pixel or region. We can do this in two ways. First, we can use an arbitrary definition of the magnitude function $\|\bullet\|$ e.g. it could be the standard Euclidean distance, or, it could be any reasonable distance function (e.g. such as one of the Minkowski family of norms). Second, we observe that if $f(I_k^{q-p}) \approx I_k^p$ then this implies that the q vector lies in a particular part of q-dimensional space. For example, f( ) is a p×(q-p) matrix transform then the q vector of responses must lie on a q-p dimensional plane embedded in q space. Thus, rather than computing a relation f( ) directly and then calculating $\|f(I_k^{q-p}) - I_k^p\|$ we could instead calculate the distance of the q dimensional plane. It follows we might rewrite our fitting function as: $\|P(I_k) - I_k\|$ where P projects the q vector onto some q-p dimensional plane. Subtracting the projected vector from the original then makes a suitable distance measure.

We can extend this idea still further and write $\|P(I_k) - I_k\| \equiv \|P^\perp(I_k)\|$ where $P^\perp(I_k)$ projects the q vector of responses onto the p dimensional plane orthogonal to the q-p dimensional plane where we expect $I_k$ to lie. More generally, we might calculate the measure $P(I_k)$ where P is a function that returns a small number when the response vector is likely for the illuminant under consideration. Here P could, for example, be some sort of probabilistic measure.

In the preferred embodiments of the present invention we determine the fit, or likelihood, that a given q-vector of responses occurs for a given light in a preprocessing step. This might be the 3×3 matrices best mapping RGBs to filtered counterparts for a given training set. Alternatively, for other embodiments we could precalculate the best relations of the form f: $\Re^{p-q} \to \Re^p$. Or, if we use the position of the response vectors directly, then we could precalculate the best fitting plane or precalculate a probabilistic model which ascribes a likelihood that given q vectors occur under different lights. However, we note that that the fit, or likelihood, that a given q-vector of responses occurs for a given light can be computed within a single image by using the image statistics. For example, for the case of 3×3 linear maps taking RGBs to filtered counterparts and where there are just two lights present in a scene we might find the pair of transforms that best accounts for the image data (one of the pair is applied at each pixel according to which light is present) by using robust statistics. We find the best 3×3 matrix that maps at least 50% of the image plus one pixel to corresponding filtered counterparts. The remaining pixels are treated as outliers and can be fit separately. The inliers and outliers determine which part of the image are lit by the different lights. Our experiments indicate good illuminant detection in this case. Further, all the different combinations of distance measures, and fitting functions described above, could, in principle, be trained on the image data itself, using standard techniques.

To summarise, when the position of the q vector of responses measured by a camera depends strongly on illumination and weakly on reflectance we can use the position in q space to measure the likelihood of this response occurring under that light. This likelihood can be calculated in many ways including testing the relationship between the first q-p responses to the last p responses (using linear or non linear functions and any arbitrary distance measure). Equally, the position of the q vector can be used directly and this includes calculating the proximity to a given plane or by a computing a probablistic or other measure. The information that is needed to measure whether a q vector is consistent with a given light can be precalculated or can be calculated based on the statistics of the image itself.

According to a second aspect of the present invention, there is provided a method of chromagenic illuminant estimation in which, in a first preprocessing stage, for a database of m lights $E_i(\lambda)$ and n surfaces $S_j(\lambda)$ there is calculated $T_i = Q_i^F Q_i^+$ where $Q_i$ and $Q_i^F$ represent the matrices of unfiltered and filtered sensor responses to the n surfaces under the i th light and + denotes an inverse, and in a second operation stage, given P surfaces in an image and 3×P matrices Q and $Q^F$, from these matrices there are chosen the r % brightest pixels giving the matrices Q' and $Q'^F$ and the scene illuminant $p_{est}$ is estimated where $$est = \min_i (err_i)(i = 1, 2, \ldots, m)$$

and $$err_i = \|T_i Q' - Q'^F\|$$

In one preferred embodiment, the inverse indicated by + is a pseudo-type inverse.

In another preferred embodiment, the inverse indicated by + is an unweighted inverse, e.g. the Moore Penrose inverse, Accordingly to a third aspect of the invention a gamut mapping estimation is combined with a chromagenic estimation method according to the first and second aspects.

According to a fourth aspect of the present invention, there is provided a method of removing from image signals the colour bias due to illumination based on the estimation of the illuminant obtained by the method according to any of the first, second or third aspects.

According to a fifth aspect of the present invention there is provided an image treatment system comprising means for estimating the illuminant in accordance with the method according to any of the first, second or third aspects, and means for using the estimate produced to remove from the image the colour bias due to the illuminant.

According to a sixth aspect of the present invention there is provided a method of chromagenic illuminant estimation in which, from mutually-corresponding filtered and unfiltered images, a fraction of the brightest pixels are selected for a subsequent chromagenic estimation.

Embodiments of the present invention comprise a number of successive stages. Firstly, we undertake a detailed error analysis of the chromagenic algorithm. We characterise the set of reflectances for which the algorithm works well and the set for which it works poorly. We find that fairly desaturated colours work well (this set includes not only whites and greys but also pastel colours). In contrast, poor performance is observed for highly saturated colours and highly saturated dark colours in particular.

This leads to the next stage. We observe that, assuming a reasonable colour diversity in a scene, the bright colours should belong to the set where the chromagenic algorithm works well. So, we propose using only the bright colours in the chromagenic algorithm.

The third stage is to observe that subject to this bright-is-right assumption we can find bright pixels in the filtered and unfiltered image pairs and assume correspondence without worrying about registration. Note that here we can have two quite different views (e.g. from two cameras in wide base line stereo or two surveillance cameras) and still carry out chromagenic constancy processing.

Experiments on real and synthetic images validate our approach. Using the standard Simon Fraser testing protocol [1], the bright-chromagenic algorithm is shown to be as good as the more complex theories. Combined with gamut mapping the bright-chromagenic approach outperforms all other algorithms.

There will first be discussed some details of image formation, computational colour constancy and the mathematical bases of the chromagenic theory.

Image Formation and Chromagenic Theory

The sensor responses $p_k$ of a typical digital camera are a combination of the sensor spectral sensitivities $Q_k(\lambda)$ and of a colour signal, $C(\lambda)$, that describes the amount of energy incident upon the image sensor. The total response of the sensor can be described as $$p_k = \int_\omega C(\lambda) Q_k(\lambda) d\lambda \qquad (1)$$

where $\omega$ denotes the range of wavelengths where the sensor has a non-zero response.

Assuming a Lambertian model of image formation, one can express $C(\lambda)$ as the product of the spectral power distribution of an illuminating source $E(\lambda)$ and a reflectance function $S(\lambda)$. Equation 1 can be rewritten as $$p_k = \int_\omega E(\lambda) S(\lambda) Q_k(\lambda) d\lambda \qquad (2)$$

A conventional camera has a trichromatic response, so k is usually represented as $\{R,G,B\}$. In addition to this conventional RGB triplet, we use a chromagenic filter to obtain another, filtered, image of the same scene. In this case, the sensor response can be calculated as $$p_k^F = \int_\omega E(\lambda) S(\lambda) F(\lambda) Q_k(\lambda) d\lambda \qquad (3)$$

where $F(\lambda)$ is the transmittance of the chromagenic filter. Using those 2 images, we record six responses per pixel, p and $p^F$ that form the input to the illuminant estimation problem. For present purposes, we set out to recover $p_E$: the RGB of the illuminant.

Chromagenic Illuminant Estimation

Let us first consider the relationship between filtered and unfiltered RGBs (Equations 2 and 3). It has been shown in [14] and [4] that when the same surfaces are viewed under two lights, the corresponding RGBs can be related by a linear transform. Here $F(\lambda)E(\lambda)$ can be thought of as a second light and so we use a 3×3 matrix to relate the RGBs captured with and without the coloured filter. We thus have:

$$\underline{p}^F = T_E^F \underline{p} \qquad (4)$$

where $T_E^F$ is a 3×3 linear transform that depends on both the chromagenic filter and the scene illuminant. Equation 4 implies that, given the chromagenic filter and sensor responses under a known illuminant, we can predict the filtered responses.

Chromagenic illuminant estimation proceeds in two stages: preprocessing and operation. In the preprocessing stage for the ith of n lights we calculate Ti: the 3×3 matrix that best maps the RGBs measured for a reference set of surfaces (under light) i) to its filtered counterparts. In the operation we use the precalculated transforms to estimate the light. Let Q and $Q^F$ denote the 3×p matrices of unfiltered and filtered RGBs of arbitrary reflectances under an unknown light. For each plausible illuminant, we calculate the fitting error $$e_i = \|T_i Q - Q^F\|; i = 1, \ldots, n \qquad (5)$$

under the assumption that $E_i(\lambda)$ is the actual scene illuminant. We then choose the transform that minimises the error and surmise that it corresponds to the scene illuminant. The RGB of the estimated illuminant is then found by a simple indexing operation.

In [5] it was shown that this simple algorithm can deliver good colour constancy. Unfortunately, the algorithm does on occasion fail badly, that is it can deliver a completely wrong answer. Aspects of the present invention seek to understand and ameliorate this failure.

BRIEF DESCRIPTION OF THE DRAWINGS

A preferred embodiment of the present invention will now be described, by way of example only, with reference to the accompanying drawings of which.

DETAILED DESCRIPTION OF PREFERRED VERSIONS OF THE INVENTION

There will now be discussed the present proposal to discriminate reflectances according to their performance. This involves modelling inliers and outliers.

Figure 1B:
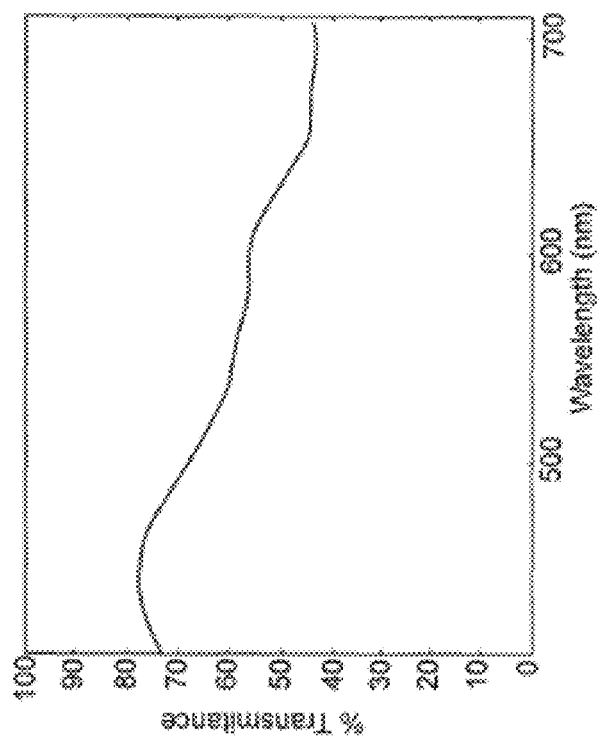
FIG. 1b relates to the bluish Wratter filter used in the experiments, with % transmittance being plotted against wavelength.
Figure 1A:
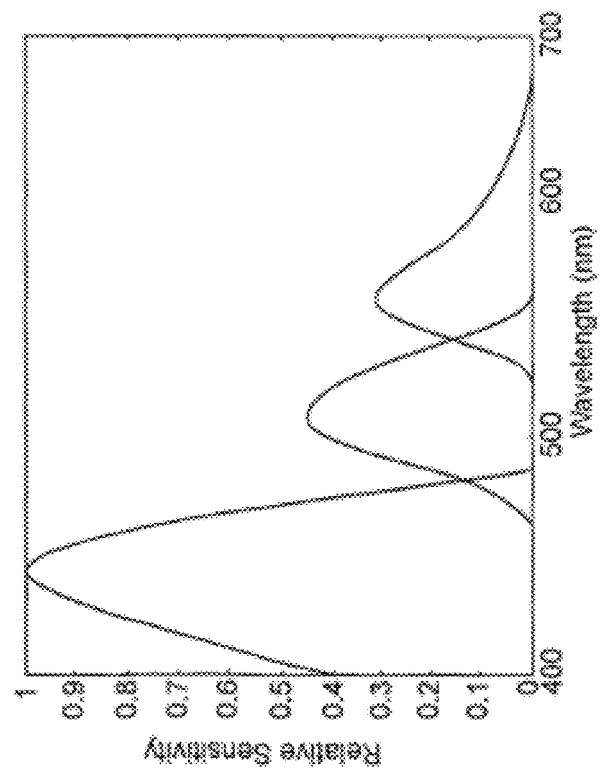
FIG. 1a shows the sensitivities of a Sony DXC-930 camera, with relative sensitivity being plotted against wavelength.

The protocol for our experiments follows the design of Barnard et al [2] who have previously conducted a thorough analysis of many leading illuminant estimation algorithms. We begin by choosing camera sensitivities $Q_k(\lambda)$ to be the sensors of a Sony DXC-930 camera and we select the chromagenic filter $F(\lambda)$ to be a non-cut off and non neutral density Wratten photographic filter [11]. Both the sensors and the chosen filter are shown in FIG. 1. We then proceed by synthesizing images using a set of 1995 reflectances and 287 illuminants. Details of both sets can be found in [1].

The chromagenic linear transforms, $T_i$ are obtained by generating sensor responses of all the 1995 reflectances under 87 illuminants. The set of 87 lights covers the same gamut as the 287, but is more coarsely sampled. The chromagenic algorithm will select one of the 87 lights as its estimate of the scene illuminant. We assess the accuracy of the estimate by calculating the angular error between the sensor responses to a white reflectance under both the estimated and actual scene illuminant. Angular error is an intensity independent measure of algorithm accuracy and is widely used in the literature [8].

We wish to better understand when the chromagenic algorithm works well and when it fails. While this seems to be a very hard problem to solve, in general we have found that the chromagenic algorithm often delivers good results (low angular error) even when there are few surfaces in a scene. Thus, we propose examining recovery error for single surface scenes. To this end, we calculate all possible RGB triplets for filtered and unfiltered responses, a total of 1995×87×2. For each of the 170,000 unfiltered RGBs, we estimate the illuminant using the 87 transforms matrices (for the 87 training lights in the Simon Fraser protocol). The transform that best fits the RGB to filtered counterpart indexes the RGB for that light. Now we have an estimated light colour and can compare this to the correct illuminant RGB. The angular error ranges from 0 to 42 degrees with a mean of about 9.3 degrees and a median of 5. For this data set, our experiments indicate that an angular error of 3 degrees or less is necessary for digital photography (for acceptable colour cast removal).

Figure 2B:
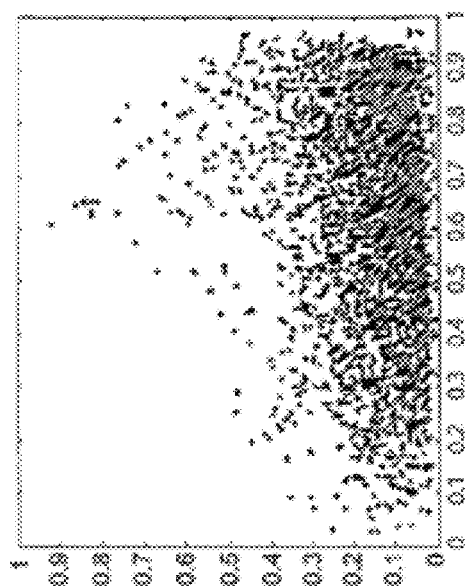
FIG. 2b shows the brightness-saturation scatter plot of the 20% best performing RGBs.
Figure 2C:
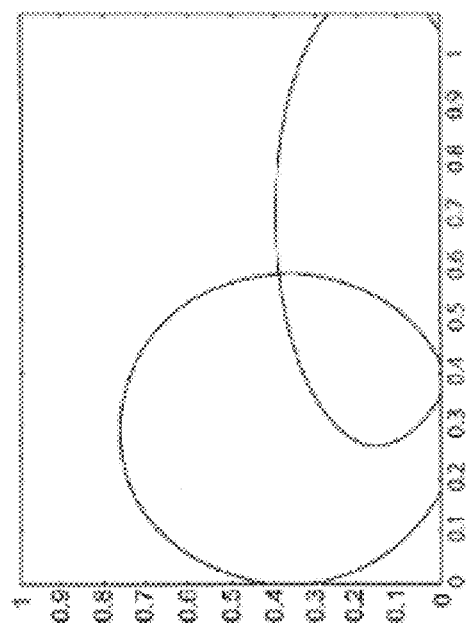
FIG. 2c shows the equi-variance ellipses of both sets, each containing 90% of their respective data, showing they are mostly disjoint.
Figure 2A:
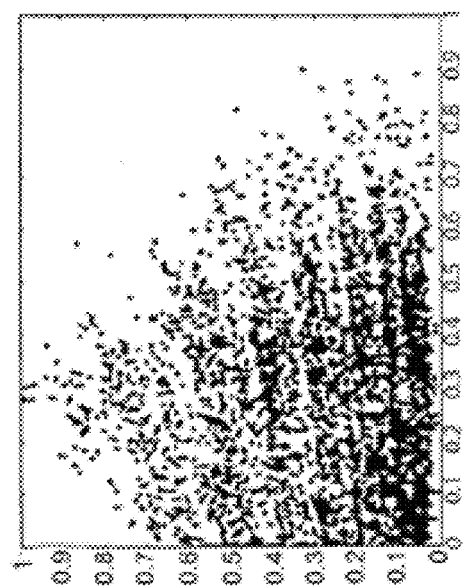
FIG. 2a shows a brightness-saturation scatter plot of the 20% worst performing RGBs.

Let us take a closer look at the RGBs that comprise the top and bottom 20% of performance. We plot the brightness and saturation of these RGBs in FIGS. 2a and 2b. It is clear that low errors correlate with bright RGBs (which are not strongly saturated) and high errors with dark and saturated RGBs. In FIG. 2c, we plot ellipses calculated for the high and low error sets. Each ellipse accounts for more than 90% of the data. Notice how disjoint the large and small error sets are. Finally we also, for completeness, looked at this error as a function of hue but found no hue dependency.

We see that many of the low error RGBs fall in a region of colour space that is disjoint from those with high error: they are bright and not too saturated. Assuming a uniform distribution of colours n an image, we propose that it is easy to find RGBs (and filtered counterparts) that belong to this preferred set. We simply look for a small percentage of the brightest image regions. We propose that the basic chromagenic algorithm should be modified so that only bright image pixels are considered. The bright-chromagenic algorithm is defined as:

Preprocessing: For a database of m lights $E_i(\lambda)$ and n surfaces $S_i(\lambda)$ calculate $T_i = Q_i^F Q_i^+$ where $Q_i$ and $Q_i^F$ represent the matrices of unfiltered and filtered sensor responses to the n surfaces under the ith light and + denotes a pseudo-type-inverse Operation: Given P surfaces in an image we have 3×P matrices Q and $Q^F$. From these matrices we choose the r % brightest pixels giving the matrices Q' and $Q'^F$. Then the estimate of the scene illuminant is $p_{est}$ where $$est = \min_i (err_i)(i = 1, 2, \ldots, m)$$

and $$err_i = \|T_i Q' - Q'^F\|$$

Because we are proposing to look only at bright image responses, the transform matrices can be calculated using a least-squares estimator where bright values are weighted more strongly. This is what we mean by a pseudo-type-inverse. However, in our experiments we have not found any strong benefit from fitting only the bright image RGBs. So, for the experiments presented in the next section we use the conventional (unweighted) Moore Penrose inverse.

Synthetic Reflectances and Synthetic Lights

The test on synthetic images is run according to the Simon Fraser testing protocol: we generate 1000 images containing n reflectances n={1, 2, 4, 8, 16, 32} randomly taken from the set of 1995. We then illuminate these images with one light taken at random from the set of 287. Separately, we create our chromagenic transforms using 1995 reflectances under 87 plausible lights. For each image, we use the chromagenic algorithm to find which of the 87 plausible lights is the best scene illuminant estimate. We then calculate the angular error between the estimated and actual lights and compare the errors calculated for the chromagenic and bright chromagenic-algorithms. In all images with more than 2 reflectances, the brightest 3 RGBs are used in the bright-chromagenic computation (the two algorithms are the same for one and two reflectances scenes). The algorithms are evaluated according to the median angular error statistic which has shown to be an appropriate measure for assessing colour constancy algorithms [8].

Figure 3B:
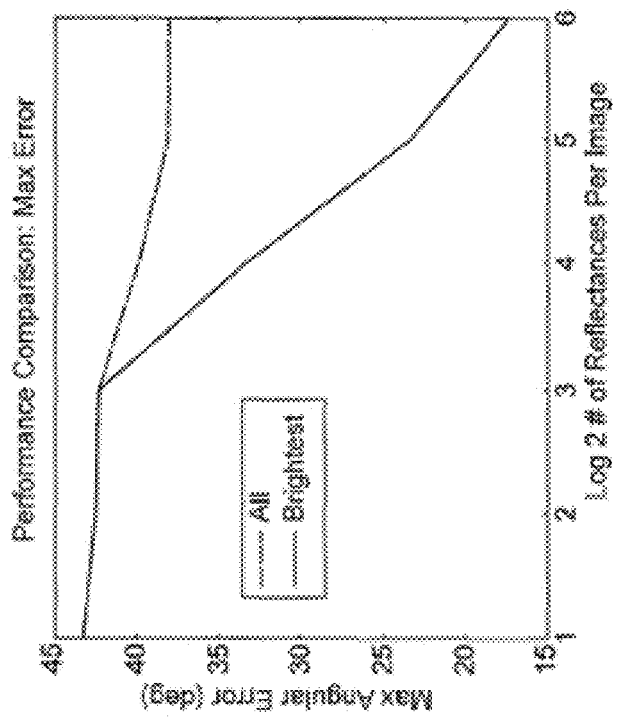
FIG. 3b shows the comparison of the max angular error, with maximum angular error (in degrees) being plotted against log 2 of reflectances per mage.
Figure 3A:
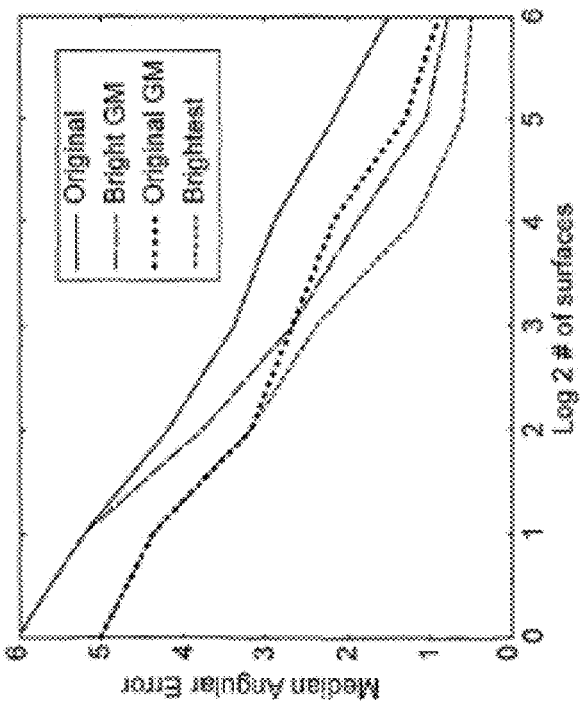
FIG. 3a shows the comparison of the median angular error for both the original and brightest only methods with median angular error being plotted against log 2 of surfaces; the gamut constrained version is also displayed (dashed)

In FIG. 3a, one can see the median angular error for both the original and bright-chromagenic versions of the algorithm, FIG. 3b shows the strong reduction of maximum errors that is achieved. We also combine the chromagenic approach with gamut mapping theory (which rules out lights inconsistent with the image data). Results for gamut mapping with chromagenic or with bright-chromagenic are also shown, including the original chromagenic algorithm with gamut mapping.

In previous work it was shown that statistically (using the Wilcoxon sign test), the hybrid chromagenic plus gamut mapping outperformed all other algorithms. The sign test also reveals that the bright-chromagenic algorithm works as well and bright-chromagenic plus gamut mapping delivers, at the 99% significance level, better performance than all other algorithms.

Real Image Reflectances and Synthetic Lights

We additionally tested these algorithm on reflectance images obtained by Nascimento and Foster [15]. These Images are of typical outdoor scenes. Due to the difficulty of measuring true multispectral radiance only the reflectances in the scene are available (not the radiance spectra). However, for our purpose we can multiply each of these reflectance images by each of the 87 test lights in the Simon Fraser set and then evaluate illuminant estimation performance. This test represents a half-synthetic evaluation.

Over the 8 images we found the bright-chromagenic algorithm delivered the best estimation with a median of 3.5 degrees of angular error which outperformed the original algorithm (6.7 degrees), maxRGB (8.7 degrees) and gray world (13 degrees). Chromagenic plus gamut mapping delivered a median error of 5.6 degrees and bright-chromagenic plus gamut mapping returned a median error of 3 degrees.

Real Images

Figure 4B:
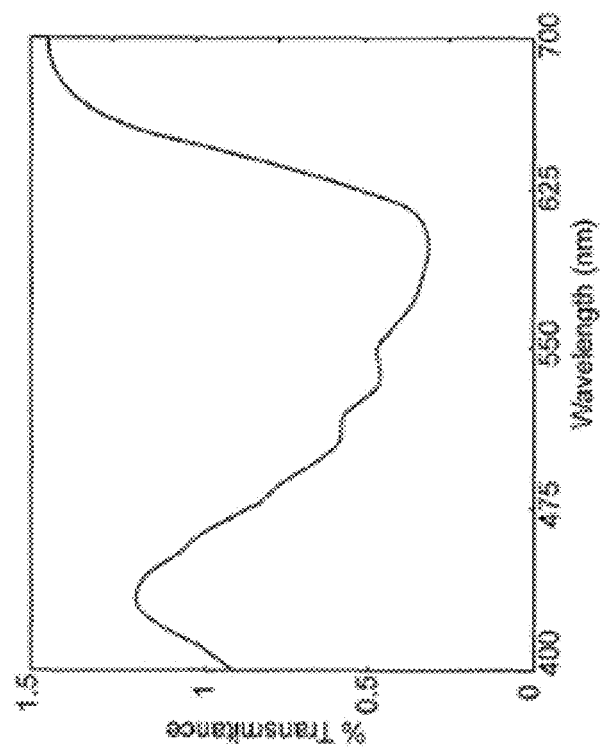
FIG. 4b relates to the filter derived from the light source data, with % transmittance being plotted against wavelength; the maximum transmittance higher than 1 is due to the camera auto-exposure function; while this is not the data of the physical filter it is what the camera "sees" and therefore what we used in training the transforms.
Figure 4A:
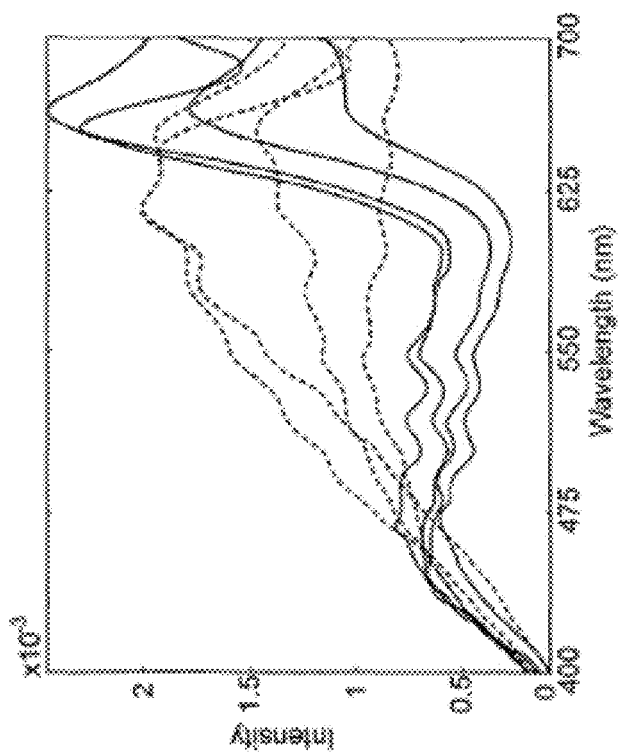
FIG. 4a relates to the filtered and unfiltered illuminants and represents the eight light sources considered in this experiment, with intensity being plotted against wavelength; the dashed lines are spectra of the light sources, while the continuous ones are from the filtered sources.

In our experiment we use the non-specular Simon Fraser Data set, which is described in [1]. This data set consists of 31 objects captured under 11 different illuminants. The 11 illuminants are part of the 87 lights used to train the transforms and the objects are rotated between different illuminants and the images are captured with respect to the Sony DXC930 camera which has known camera sensitivities. Eight of these lights come in pairs, the original lamp light and the lamp filtered through a bluish filter. Since the actual spectra of the illuminants are given as part of the Simon Fraser dataset, we can therefore derive the filter used. The 8 illuminants and the derived filter are shown in FIG. 4. Relative to this filter we obtain the transforms T according to the preprocessing step, using the camera sensitivities, the set of 1995 synthetic reflectances, the 87 illuminants set and the filter derived above.

The corresponding pixels in the two images can be in the same pixel location. However, the images of the Simon Fraser Data set are not necessarily, and can be quite far from, registered. Thus, registration is not required in the bright-chromagenic algorithm. Rather, we simply take the top 1% of the brightest pixels in both filtered and unfiltered images, and place these in correspondence. In other words, the corresponding pixels can be in different locations, with their mean brightness being in the same rank order. Typically these pixels belong to one or two of the surfaces in the scene. We then find which of the 87 transforms best model out data and use this to estimate the RCB of the light.

The angular errors reported in the first two columns of Table 1 show that, despite its simplicity, the bright chromagenic algorithm outperforms in terms of mean error all other algorithms and is as good as any other evaluated in terms of median error and the Wilcoxon sign test at 99% confidence level. The bright-chromagenic algorithm with the additional gamut constraint has the best mean and median error, 4.5 and 3.3 degrees respectively, statistics and, moreover, is found to be statistically better than all other algorithms at the 99% confidence level. The original chromagenic algorithm is not displayed in this table since it requires registered images.

CONCLUSION

Thus it will be seen that, in embodiments of the present invention, a chromagenic illuminant estimation algorithm exploits the relationship between RGBs captured by a conventional camera and those captured through a coloured filters. Different lights induce different relationships and so, the illuminant colour can be estimated by testing precomputed relations in situ. While the chromagenic approach can work well it occasionally works poorly. Moreover, typical chromagenic camera embodiments such as a stereo rig or where there are multiple surveillance cameras (a filter can easily be placed over one camera) do not have pixel registration and this is assumed in chromagenic theory.

As described in connection with embodiments of the present invention, a detailed error analysis demonstrated that bright pixels in images generally lead to small chromagenic estimation errors. This led to the bright-chromagenic algorithm which bases estimation only on a fixed percentage of the brightest pixels in the filtered and unfiltered images. Importantly, these pixels are chosen independently in each image so there is no need for image registration. Experiments on a large set of synthetic and real data demonstrate that the bright-chromagenic algorithm delivers illuminant estimation as good or better than all other algorithms tested. A hybrid algorithm that combines the conventional gamut mapping estimation algorithm with the bright-chromagenic approach delivers better performance than all other algorithms.

Where reference is made in this specification to a filtered and an unfiltered image, one can use instead two filtered images with different filtering,

TABLE 1

| Algorithm | Mean | Median | Chr | RGB | GW | DB | NN | GM | CbyC |
|---|---|---|---|---|---|---|---|---|---|
| Chromagenic | 4.8 | 3.7 | = | + | + | + | + | = | = |
| Max RGB | 6.4 | 4.1 | − | = | + | + | + | − | − |
| Grey World | 11.9 | 9.3 | − | − | = | − | = | − | − |
| Database GW | 10 | 7 | − | − | + | = | = | − | − |
| Neural Network | 8.9 | 7.8 | − | − | = | = | = | − | − |
| LP Gamut Mapping | 5.5 | 3.8 | = | = | + | + | + | = | = |
| Colour by Corr | 6 | 3.6 | = | + | + | + | + | = | = |

Summary of the results on the Simon Eraser dataset. The table shows mean and median angular error as well as the results of the Wilcoxon sign test at the 99% level, A + indicates that the algorithm in the corresponding row performs significantly (in a strict statistical sense) better than the one in the corresponding column, A − is the other way around, while an = sign means that the two algorithms cannot be separated.

REFERENCES

[1] K. Barnard, B. V. Funt, and A. Coath, A data set for color research. *Color Research and Application*, pages 148-152, 2002.

[2] K. Barnard, L. Martin, A. Coath, and B. Funt, A comparison of computational color constancy algorithms, part one: Methodology and experiments with synthetic images. *IEEE Trans. on Image Processing*, 11:972-984, 2002.

[3] G. Buchsbaum. A spatial processor model for object colour perception. *Journal of the Franklin Institute*, 310: 1-26, 1980,

[4] M. D'Zmura and G. Iverson. Color constancy i: Basic theory of two-stage linear recovery of spectral descriptors for lights and surfaces. *Journal of the Optical Society of America*, 10:2148-2165, 1993.

[5] G. Finlayson, S. Hordley, and P. Morovic. Colour constancy using the chromagenic constraint. In *Computer Vision and Pattern Recognition (CVPR)* 2005, pages 1079-1086, 2005.

[6] G, D. Finlayson, S. D. Hordley, and P. Hubel. Color by correlation: A simple, unifying framework of color constancy. *IEEE PAMI*, 23:1209-1221, 2001.

[7] G. D. Finlayson and R. Xu. Convex programming colour constancy. In *IEEE Workshop on Color and Photometric Methods in Computer Vision*, pages-, 2003.

[8] S. D. Hordley and G. D. Finlayson. Re-evaluating colour constancy algorithms. In *IEEE Conf on Pattern Recognition (ICPR)*, pages 76-79, 2004.

[9] H. Jiang and M. Drew. Tracking objects with shadows. In *CME03: International Conference on Multimedia and Expo*, pages 100-105, 2003.

[10] G. J. Klinker, S. A. Shafer, and T. Kanade, A physical approach to color image understanding, *International Journal of Computer Vision*, 4:7-38, 1990.

[11] Kodak, *Kodak Wratten filters 4th Edition*. Kodak Limited London, 1969,

[12] E. H. Land. The retinex theory of color vision. *Scientific American*, pages 108-129, 1977.

[13] S. Lin and S. Lee. Detection of specularity using stereo in color and polarization space. *Computer Vision and Image Understanding*, 65:336-346, 1997.

[14] L. T. Maloney and B. A. Wandell. Color constancy: a method for recovering surface spectral reflectance. *Journal of the Optical Society of America A*, 3:29-33, 1986.

[15] S. M. C. Nascimento, F. Ferreira, and D. H. Foster. Statistics of spatial cone-excitation ratios in natural scenes. *Journal of the Optical Society of America A*, 19:1484-1490, 2002.

[16] M. J. Swain and D. H. Ballard. Color indexing. *International Journal of Computer Vision*, 7:11-32, 1991.

What is claimed is:

1. A non-transitory program storage device comprising instructions stored thereon to cause one or more processors to:
    obtain access to a first image having a first set of spectral components;
    obtain access to a second image having a second set of spectral components, wherein the first and second images are mutually corresponding images;
    select a particular fraction of pixels from each of the first and second images in descending order of brightness; and
    generate a chromagenic illuminant estimation based, at least in part, on the selected particular fraction of pixels.

2. The non-transitory program storage device of claim 1, wherein the mutually corresponding images have a different filtering.

3. The non-transitory program storage device of claim 2, wherein the mutually corresponding images comprise a filtered image and an unfiltered image.

4. The non-transitory program storage device of claim 1, wherein brightness values of pixels in the first image are compared with brightness values of pixels in the second image in rank order.

5. The non-transitory program storage device of claim 1, wherein the instructions to generate a chromagenic illuminant estimation further comprise instructions to cause the one or more processors to compare pixels in the first image to pixels in the second image, wherein at least of portion of the pixels compared are in the same pixel locations in the first image and the second image.

6. The non-transitory program storage device of claim 1, wherein 0.5% to 20% of the brightest pixels are selected from each of the first and second images.

7. The non-transitory program storage device of claim 6, wherein 1% to 3% of the brightest pixels are selected from each of the first and second images.

8. The non-transitory program storage device of claim 1, wherein the instructions to generate a chromagenic illuminant estimation further comprise instructions to cause the one or more processors to compare m responses in the first image to a corresponding n responses in the second image.

9. The non-transitory program storage device of claim 1, comprising further instructions stored thereon to cause the one or more processors to perform a gamut mapping process on the estimated illuminant.

10. The non-transitory program storage device of claim 1, comprising further instructions stored thereon to cause the one or more processors to remove colour bias due to illumination from at least one of the first and second images.

11. The non-transitory program storage device of claim 10, comprising further instructions stored thereon to cause the one or more processors to render one of the at least one of the first and second images that has had color bias due to illumination removed.

12. A system, comprising:
    a display; and
    one or more processors in communication with the display, wherein the one or more processors are programmed to execute instructions to:
        select a fraction of the brightest pixels from each of a pair of mutually corresponding images; and
        perform chromagenic illuminant estimation on at least one of the pair of mutually corresponding images,
        wherein the pair of mutually corresponding images have different sets of spectral components, and
        wherein the programmed act of selecting the fraction of the brightest pixels comprises executing instructions to select a particular fraction of pixels from each of the mutually corresponding images in descending order of brightness from the brightest pixel in each of the mutually corresponding images.

13. The system of claim 12, wherein the mutually corresponding images have a different filtering.

14. The system of claim 13, wherein the mutually corresponding images comprise a filtered image and an unfiltered image.

15. The system of claim 12, wherein brightness values of pixels in a first one of the mutually corresponding images are compared with brightness values of pixels in a second one of the mutually corresponding images in rank order.

16. The system of claim 12, wherein there are compared pixels in the mutually corresponding images which are in the same pixel locations.

17. The system of claim 12, wherein the one or more processors are further programmed to execute instructions to perform a gamut mapping process on the estimated illuminant.

18. The system of claim 12, wherein the one or more processors are further programmed to execute instructions to remove colour bias due to illumination from at least one of the mutually corresponding images.

19. The system of claim 18, wherein the one or more processors are further programmed to execute instructions to render to the display the at least one of the mutually corresponding images which has had color bias due to illumination removed.

20. A method, comprising:
- selecting a fraction of the brightest pixels from each of a pair of mutually corresponding images; and
- performing chromagenic illuminant estimation on at least one of the pair of mutually corresponding images,
- wherein the pair of mutually corresponding images have different sets of spectral components, and
- wherein the act of selecting the fraction of the brightest pixels comprises selecting a particular fraction of pixels from each of the mutually corresponding images in descending order of brightness from the brightest pixel in each of the mutually corresponding images.

* * * * *

UNITED STATES PATENT AND TRADEMARK OFFICE
CERTIFICATE OF CORRECTION

PATENT NO. : 8,811,729 B2  
APPLICATION NO. : 13/743893  
DATED : August 19, 2014  
INVENTOR(S) : Finlayson et al.

Page 1 of 1

It is certified that error appears in the above-identified patent and that said Letters Patent is hereby corrected as shown below:

In the Claims:

Column 12, line 5 (Claim 5, line 5), replace "of portion of" with --a portion of--.

Signed and Sealed this
Fourteenth Day of October, 2014

Michelle K. Lee
*Deputy Director of the United States Patent and Trademark Office*